3,152,190
CATALYTIC HYDROGENATION OF ORGANOBORON COMPOUNDS

Nelson N. Schwartz, Morristown, and Marvin M. Fein, Westfield, N.J., assignors to Thiokol Chemical Corporation, Bristol, Pa., a corporation of Delaware
No Drawing. Filed Sept. 29, 1960, Ser. No. 59,456
6 Claims. (Cl. 260—606.5)

This invention relates to a method for the catalytic hydrogenation of compounds of the class

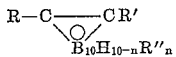

wherein R and R' are hydrogen, alkyl radicals or alkenyl radicals, at least one of R and R' being an alkenyl radical, the total number of carbon atoms in R and R' being from 0 to 8, R'' is a lower alkyl radical, and $n$ varies from 0 to 4.

The preparation of compounds of the above class can be prepared by the method described in application Serial No. 59,460 of Jack Bobinski, Marvin M. Fein and Nathan Mayes filed of even date herewith. For example, C-isopropenylvinylenedecaborane of the formula

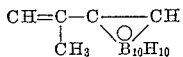

can be prepared by heating isopropenyl acetylene with bis (acetonitrilo) decaborane in benzene at 50° C. for 24 hours.

By the method of this invention, compounds of the above class are hydrogenated by reaction with hydrogen in the presence of a hydrogenation catalyst until the theoretical amount of hydrogen has been absorbed. The hydrogenation proceeds at standard conditions of temperature and pressure although the reaction temperature can vary from 25° C. to 80° C. and the hydrogen pressure can vary from about one to several atmospheres. The reaction to go to completion generally requires about ¼ to 24 hours depending upon the particular reactant to hydrogenated and the temperature and pressure employed.

Advantageously the reaction is carried out while the unsaturated material is in admixture with an inert organic solvent. Suitable organic solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane, and oxygenated organic solvents such as tetrahydrofuran, ethyl acetate, diisopropyl ether, and acetic acid.

The hydrogenation catalysts which can be employed are those useful for promoting the addition of hydrogen to the carbon-carbon double bond of olefinic hydrocarbons and preferably those useful at relatively low temperatures and pressures. These latter include the colloidial and non-colloidal nickel and noble metal catalysts of the platinum group, i.e., platinum, palladium, iridium, rhodium, etc., Raney nickel, and the platinum group metals supported on carriers such as activated carbon. For higher pressure hydrogenation reaction, catalysts such as mixed copper oxide-chromium oxide can be employed.

The process of the invention is illustrated in detail by the following examples. The Adams catalyst employed in the examples is prepared by the method described by Adams and Shriner," J. Amer. Chem. Soc.," vol. 45, page 2171 (1923), and by Voorhees and Adams, "J. Amer. Chem. Soc.," vol. 44, page 1397 (1922). The preparation and use of the Adams catalyst is also described in "Hydrogenation of Organic Substances," C. Ellis, Third Edition, D. Van Nostrand Co. (1930).

Example I 149 milligrams of C-isopropenylvinylenedecaborane of the formula

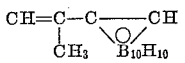

in 10 milliliters of tetrahydrofuran were added to 180 milligrams of reduced Adams catalyst in 20 milliliters of tetrahydrofuran in an atmosphere of hydrogen at 23½° C. and atmospheric pressure. After 10 minutes absorption ceased. A total of 21.1 milliliters of hydrogen were absorbed. The theoretical amount of hydrogen required is 19.8 milliliters. The reaction mixture was filtered and concentrated by evaporation of the tetrahydrofuran. An infrared spectrum of the residue indicated that the isopropenyl group had been reduced to an isopropyl group.

Example II 30 grams of solid crude C-isopropenylvinylenedecaborane of the formula

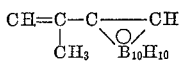

in 50 milliliters of acetic acid containing 0.5 gram of Adams catalyst were shaken in a Parr hydrogen apparatus under 25 p.s.i.g. of hydrogen. After no further pressure drop occurred, the solution was filtered, concentrated and distilled at 100–105° C. at 1 millimeter Hg pressure absolute. A colorless product was obtained which had a freezing point of $-2°$ to $-1.5°$ C. and as a density $d_4^{25} = 0.927$.

An elemental analysis for $C_5H_{18}B_{10}$ was as follows:

|  | C | H |
|---|---|---|
| Calculated | 31.1 | 9.7 |
| Found | 31.7 | 8.7 |

The saturated products prepared by the method of this invention are compounds of the class

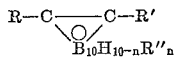

wherein R and R' are hydrogen or alkyl radicals, the total number of carbon atoms in R and R' being from 0 to 8, R'' is a lower alkyl radical, and $n$ varies from 0 to 4. The solid compounds of this class, when incorporated with suitable oxidizers such as ammonium perchlorate, potassium perchlorate, sodium perchlorate, ammonium nitrate and the like, are useful in the formulation of soild propellants suitable for rocket power plants and other ject propelled devices in the same manner as is described for the same compounds in the above-mentioned application Serial No. 59,460 of Jack Bobinski, Marvin Fein and Nathan Mayes filed of even date herewith. The liquid compounds prepared by the method of this invention are useful as high energy fuels when burned with air in basic and auxiliary combustion systems in gas turbines, particularly aircraft gas turbines of the turbojet or turboprop type, in the same manner as is described for the same compounds in the above mentioned application Serial No. 59,460 of Jack Bobinski, Marvin M. Fein and Nathan Mayes.

We claim:
1. A method for the catalytic hydrogenation of organoboron compounds containing an alkenyl group which comprises reacting with hydrogen in the presence of a hydrogenation catalyst an organoboron compound of the class

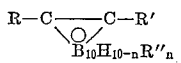

wherein R and R' are selected from the class consisting of hydrogen, alkyl radicals and alkenyl radicals, at least one of R and R' being an alkenyl radical, the total number of carbon atoms in R and R' being from 0 to 8, R'' is a lower alkyl radical, and $n$ varies from 0 to 4.

2. The method of claim 1 wherein the reactants are in admixture with an inert solvent.

3. The method of claim 1 wherein the organoboron compound is C-isopropenylvinylenedecaborane of the formula

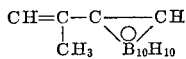

4. The method of claim 1 wherein the hydrogenation catalyst is reduced Adam's catalyst.

5. The method of claim 2 wherein the hydrogenation catalyst is reduced Adam's catalyst, wherein the organoboron compound is C-isopropenylvinylenedecaborane of the formula

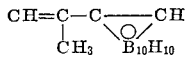

and wherein the inert solvent is tetrahydrofuran.

6. The method of claim 2 wherein the hydrogenation catalyst is reduced Adam's catalyst, wherein the organoboron compound is C-isopropenylvinylenedecaborane of the formula

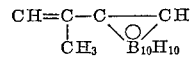

and wherein the inert solvent is acetic acid.

References Cited in the file of this patent
UNITED STATES PATENTS

| | | |
|---|---|---|
| 3,028,432 | Ross | Apr. 3, 1962 |
| 3,092,659 | Heying | June 4, 1963 |
| 3,092,664 | Clark | June 4, 1963 |

OTHER REFERENCES

Vogel: A Text-Book of Organic Chemistry, Longmans, Green and Co., New York, 1948, pages 457 to 461 and 803 to 810.